(12) United States Patent
Williams

(10) Patent No.: US 10,839,082 B2
(45) Date of Patent: Nov. 17, 2020

(54) IDENTIFYING, CATEGORIZING AND RECORDING A QUALITY OF AN ENTITY/RESOURCE ASSOCIATION

(71) Applicant: International Business Machines Corporation, Armonk, NY (US)

(72) Inventor: Ronald Becker Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 861 days.

(21) Appl. No.: 14/148,095

(22) Filed: Jan. 6, 2014

(65) Prior Publication Data
US 2015/0193524 A1    Jul. 9, 2015

(51) Int. Cl.
| G06F 16/00 | (2019.01) |
| G06F 21/57 | (2013.01) |
| G06F 11/30 | (2006.01) |
| G06F 21/55 | (2013.01) |
| G06F 17/40 | (2006.01) |

(52) U.S. Cl.
CPC ........ G06F 21/577 (2013.01); G06F 11/3006 (2013.01); G06F 21/552 (2013.01); G06F 17/40 (2013.01)

(58) Field of Classification Search
CPC ......... G06F 17/30828; G06F 17/30604; G06F 17/278; G06F 17/40; G06F 11/3006; G06F 21/577; G06F 21/552
USPC ....................................................... 707/740
See application file for complete search history.

(56) References Cited

U.S. PATENT DOCUMENTS

| 7,010,526 | B2 | 3/2006 | Denesuk et al. | |
| 8,179,798 | B2 | 5/2012 | Alperovitch et al. | |
| 8,214,765 | B2 * | 7/2012 | Holm-Petersen | G06F 16/248 715/838 |
| 8,375,068 | B1 * | 2/2013 | Platt | G06Q 30/06 707/805 |
| 8,463,636 | B2 * | 6/2013 | Ahsan | G06Q 10/06 705/7.14 |
| 8,613,066 | B1 * | 12/2013 | Brezinski | G06F 21/32 726/7 |
| 9,020,919 | B2 * | 4/2015 | Cai | G06F 17/30241 707/705 |

(Continued)

OTHER PUBLICATIONS

Gerhards, "The Syslog Protocol," Internet Request for Comment 5424, Mar. 2009.

(Continued)

*Primary Examiner* — Thanh-Ha Dang
(74) *Attorney, Agent, or Firm* — Jeffrey S. LaBaw; David H. Judson

(57) ABSTRACT

A data model extends or supplements an entity/resource association to include a "quality" of that association, where the quality is defined by an ordered set of relative values/characteristics. In an example scenario, an entity/resource association is augmented to include a quality characteristic that is defined by a tuple that is preferably an ordered set of relative values. The number of values and their designations in the data model will depend on nature of the underlying entity/resource association. When entity/resource associations are annotated to include relative quality values in this manner, much more useful comparisons of apparently similar entity/resource associations may be carried out.

20 Claims, 4 Drawing Sheets

(56) References Cited

U.S. PATENT DOCUMENTS

| | | | |
|---|---|---|---|
| 2005/0125387 A1* | 6/2005 | Fish | G06F 16/907 |
| 2006/0004821 A1 | 1/2006 | Bhasker et al. | |
| 2010/0115341 A1* | 5/2010 | Baker | H04L 41/16 |
| | | | 714/37 |
| 2011/0196786 A1 | 8/2011 | Lacerte et al. | |
| 2014/0019239 A1* | 1/2014 | Qu | G06F 16/24578 |
| | | | 705/14.53 |
| 2014/0068423 A1* | 3/2014 | Nakashima | G06F 40/166 |
| | | | 715/243 |

OTHER PUBLICATIONS

Keeni, "Textual Conventions for Syslog Management," Internet Request for Comment 5427, Mar. 2009.

Channabasappa et al, "Management Event Management Information Base (MIB) for PacketCable- and IPCablecom-Compliant Devices," Internet Request for Comment 5428, Apr. 2009.

Lonvick, "The BSD syslog Protocol," Internet Request for Comment 3164, Aug. 2001.

\* cited by examiner

IDENTIFYING, CATEGORIZING AND RECORDING A QUALITY OF AN ENTITY/RESOURCE ASSOCIATION

BACKGROUND OF THE INVENTION

Technical Field

This disclosure relates generally to management of information technology (IT) systems.

Background of the Related Art

Businesses often have to provide information to show compliance with different external regulations including government and industry regulations and, in addition, to demonstrate compliance with internal policies and procedures. Often times, compliance may be shown using information contained in audit logs maintained by information technology (IT) organizations. Audit logs are useful for checking the enforcement and effectiveness of information technology controls, accountability, and vulnerability, and/or risk analysis. An information technology organization also may use auditing of security related critical activities to aid in forensic investigations, such as security incidents that may occur. When a security incident occurs, an audit log enables an analysis of the history of activities that occurred prior to the security incident occurring. These activities include, who did what, when, where, and how. With the analysis of an audit log, appropriate corrective actions may be taken. Audit logs are typically made available in relational databases to allow easy querying of the information by reporting programs or software to generate operational and trend reports.

In a typical logging or audit scenario, various computing systems record information that associates identifiable entities (e.g., a user, a user's e-mail address or log-in name, etc.) with various types of system activity or resources (e.g., access to a particular machine at an IP or MAC address, access to a particular resource, etc.). These types of systems also typically provide a mechanism to record the entity/resource (e.g., user/activity) association, e.g., in log files or other storage mechanisms. As noted above, the capture of user/activity association is useful for various compliance purposes, and it may also be useful for security and non-security applications in support of other monitoring purposes.

It may be desirable for an auditor to examine the logs from disparate systems that record information about the same entities. An example would a user who first associates to a web server over an SSL (Secure Sockets Layer) connection as a result of an authentication event (e.g., using a captive web portal). Because of the nature of the underlying technology, subsequent requests across such a connection can be reliability and continuously associated with the user who has so authenticated. That same user, however, may also be tracked by a separate network protection device (e.g., an intrusion protection system, or IPS) while the user's connections are associated to various resources. The entity/resource associations tracked by the IPS, however, may not be as reliable given that, in this instance, an IPS is tracking information about the association between a user identifier and an IP address that is asserted from an external service, and not directly from an authentication at the IPS itself. In both instances, however, an entity/resource association is logged for the very same user, however, the reliability of the resulting data records is not necessarily similar due to the significantly different mechanisms by which user and activity are associated by the disparate systems. An auditor examining logs from both systems may observe activity on both for the same user, but the differences between the underlying mechanisms make drawing conclusions about such activity or the legitimacy of each such association (or some follow-on association) questionable. In particular, in the first case, there are strong technical reasons (due to the nature of the SSL protocol and its strong connection to the authenticating user) to believe the user/activity association is reliable and unforgeable. In the second case, however, there are a number of equally strong technical reasons why the association may not be reliable.

Existing techniques do not provide an auditor or other permitted observer with an appropriate basis to determine or assess the reliability of the association indicated by data records. In general, an observer is likely to assume that the information in each log represents an equivalent scenario. Such an assumption, however, may well prove to be problematic or even dangerous in various compliance or other similar situations where high reliability of such entity/resource association data is required.

This disclosure addresses this problem.

BRIEF SUMMARY OF THE INVENTION

According to this disclosure, a data model extends or supplements an entity/resource association to include a "quality" of that association, where the quality is defined by an ordered set of relative values/characteristics. In an example scenario, an entity/resource association is augmented to include a quality characteristic that is defined by a tuple that is preferably an ordered set of relative values, such as {strong, weak}, {very strong, strong, weak, very weak], or the like. The number of values and their designations in the data model depend on the nature of the underlying entity/resource association. In an example scenario involving authentication in log records, a representative set of quality values include: {strong authentication, loose authentication, and loose observational}. When entity/resource associations are annotated to include relative quality values in this manner, much more useful comparisons of apparently similar entity/resource associations may be carried out.

In a representative embodiment, first and second information technology systems generate first and second respective entity/resource associations as activities occur with respect to those systems. In an authentication scenario, the entity/resource association is observational or obtained subsequent to an authentication event triggered on the system on which the entity/resource association is implemented. According to this disclosure, each such first and second respective entity/resource association is then categorized according to an enumerated set of relative quality values (e.g., "strong authentication," "loose authentication" and "loose observational"). The definition of the quality categories and their enumeration may be system-defined, user-defined, manual, automatic or programmatic. Each first and second entity/resource association and its associated quality are then recorded (e.g., saved in a log file). Meaningful comparisons of these entity/resource associations may then be made to facilitate an audit, compliance, monitoring or other security-related scenario. In this manner, the data model records a quality of an entity/resource association preferably alongside the association itself, thereby providing an observer of the resulting records with a way to distinguish such records based on the quality assessment.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
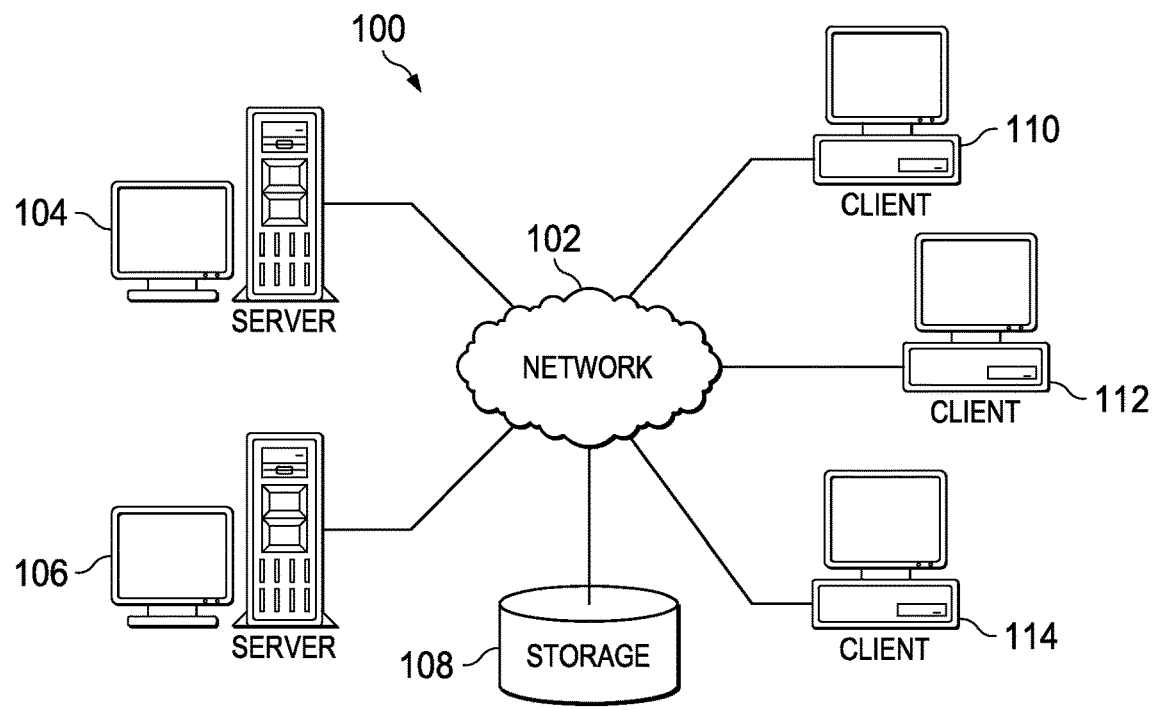
FIG. 1 depicts an exemplary block diagram of a distributed data processing environment in which exemplary aspects of the illustrative embodiments may be implemented.
Figure 2:
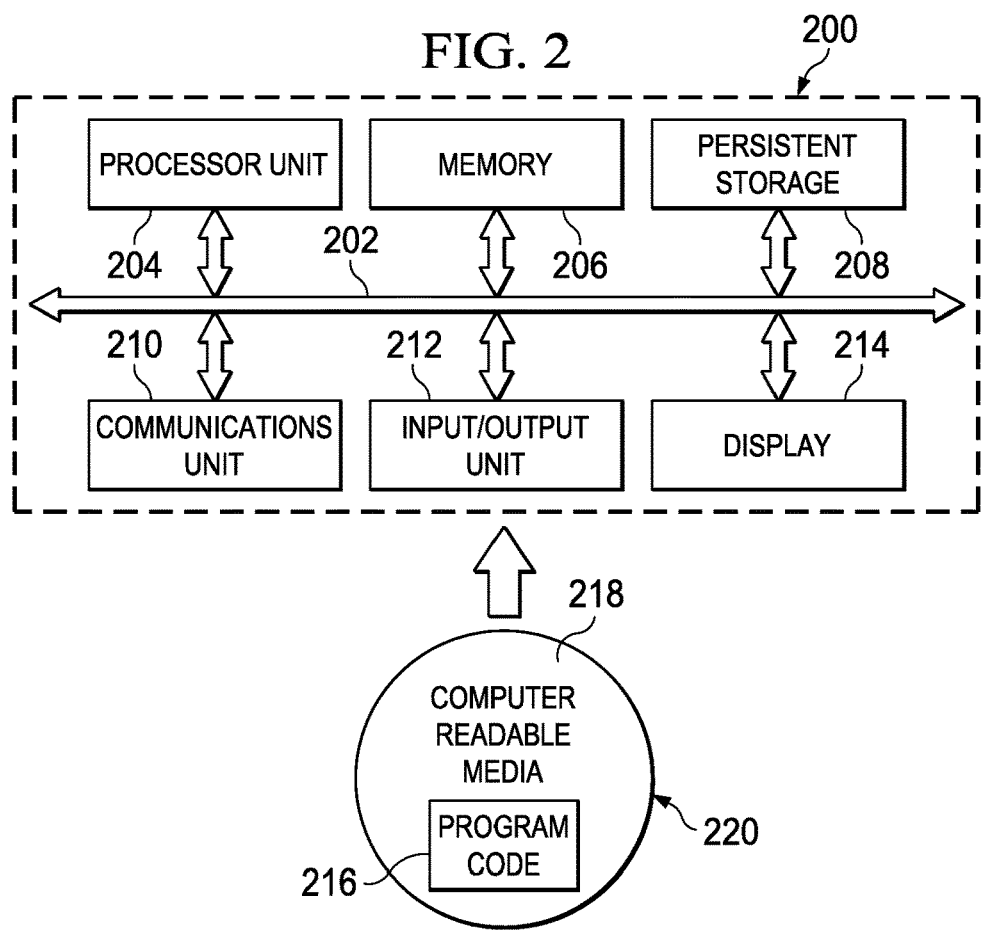
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Logging/Audit Systems

Figure 3:
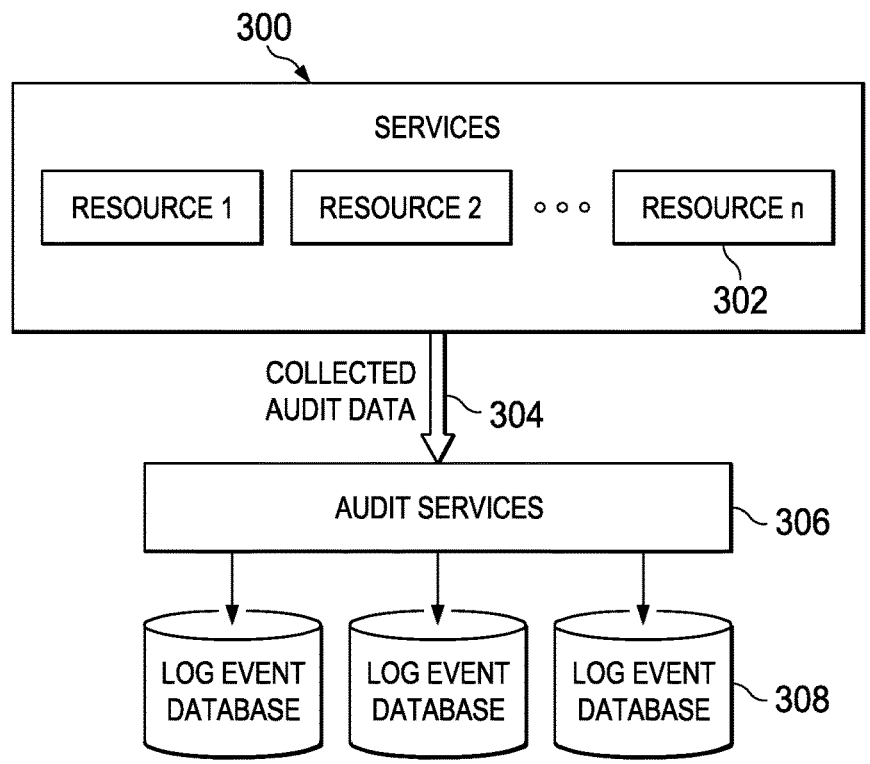
FIG. 3 illustrates a representative auditing system in which the techniques of this disclosure may be implemented.

FIG. 3 illustrates how log data is retrieved from audited resources that are used to provide various services in a computing environment. In this example, the services 300 expose a set of resources 302 (e.g., resources 1-n) hosted, e.g., in an enterprise, behind a web portal, in a shared pool of configurable computing resources (e.g., a cloud compute infrastructure), or the like. The "resource" should be broadly construed to cover any system, machine, process, program, application, utility, object or data associated therewith. Typically, collected audit data 304 is provided to an audit service 306, which normalizes that data and puts into log event databases 308 to allow for analyzing the data and creating reports that can be used for compliance. Audit service 306 typically comprises a distributed set of machines, programs and associated data structures that collectively provide the service, all in a known manner.

Figure 4:
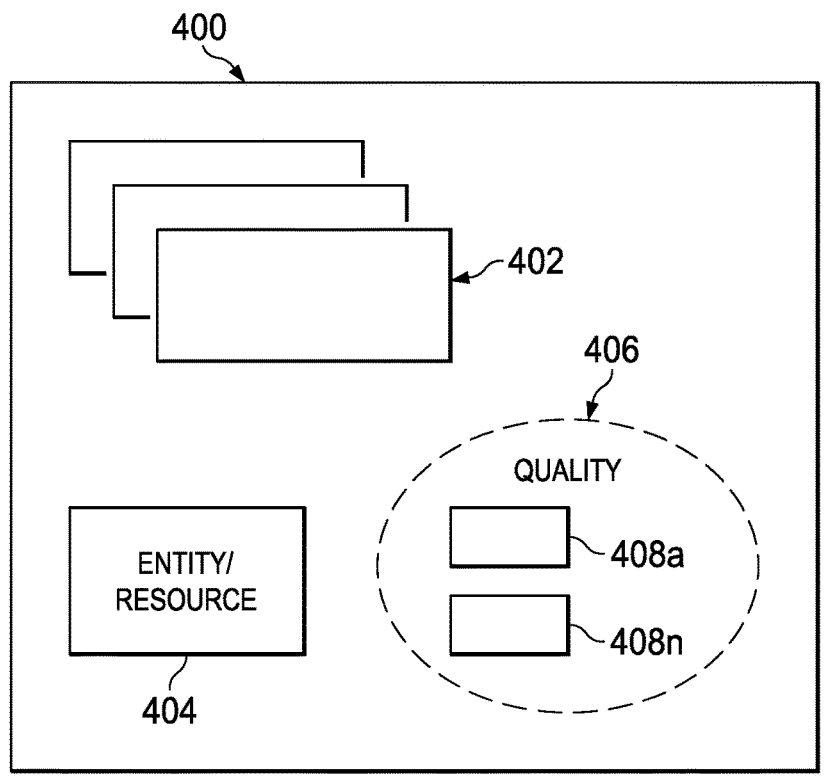
FIG. 4 is a simplified representation of an entity/resource association data model that is augmented or extended to include an association quality value according to this disclosure.

Identifying, Categorizing and Recording a Quality of an Entity/Resource Association With the above as background, the subject matter of this disclosure is now described. As described above, and according to this disclosure, a data model extends or supplements an entity/resource association to include a "quality" of that association, where the quality is defined by an ordered set of relative values/characteristics. FIG. 4 illustrates the basic data model. The data model 400 comprises a plurality of data records 402, each of which includes an entity/resource association 404 that is annotated, preferably at the point at which the association is captured, with additional data 406 in the form of a quality assessment. The quality assessment 406 may be quite varied depending on the nature of entity/resource association, but typically the quality assessment 406 includes a set of relative quality values 408a-n. The number of quality enumerators 408 and their particular values also depends on the nature of the entity/resource association, the type of system that logs the association, and other factors (e.g., time-of-day, type of entity, type of resource, etc.).

A particular entity/resource association may have more than one quality metric associated therewith. Thus, the entity/resource association may have a first quality (quality$_1$, selected from a set of relative quality values), a second quality (quality$_2$, also selected from a set of relative quality values), and so on.

Generalizing, according to this disclosure, first and second information technology systems (devices, processes, programs, or the like) generate first and second respective entity/resource associations as activities occur with respect to those systems. In an authentication scenario, the entity/resource association is observational or obtained subsequent to an authentication event triggered on the system on which the entity/resource association is implemented. According to this disclosure, each such first and second respective entity/resource association is then categorized according to an enumerated set of relative quality values (e.g., "strong authentication," "loose authentication" and "loose observational"). The particular quality that is associated with a given entity/resource association typically is dependent on a characteristic of the interaction. Thus, if the interaction may be deemed (e.g., due to the underlying technology, or other implementation-specific details) to represent a higher quality interaction than, say, another interaction (e.g., one that uses less-secure enabling technologies), then a higher quality will be assigned/associated to the former as compared to the latter interaction. The definition of the quality categories and their enumeration may be system-defined, user-defined, manual, automatic or programmatic. Each first and second entity/resource association and its associated quality are then recorded (e.g., saved in a log file). Meaningful comparisons of these entity/resource associations may then be made to facilitate an audit, compliance, monitoring or other security-related scenario. In this manner, the data model records a quality of an entity/resource association preferably alongside the association itself, thereby providing an observer of the resulting records with a way to distinguish such records based on the quality assessment.

As defined, for example, in Internet Request for Comment (RFC) 2828, an entity/resource association defines some identifiable relationship between the entity (typically specified as an entity identifier) and the resource (typically specified by some identifier associated with a system resource. For example, an entity/resource association 404 may be an email address associated with an IP address (alice@nowhere.net|10.1.1.1), or a login name associated with an Ethernet (MAC) address (bob\4a5f779c62ba2d44). The quality assessment (the association quality) 406 may then one of several relative values 408, such as: LOOSE_IP (value 1); AUTH_IP (value 2); AUTH_BINDING (value 3), and so forth. These relative association quality values may be represented by the quality enumerator, or by their respective numeric values, or both. Preferably, the relevant computing entity in which the data model is implemented provides a mechanism by which a permitted user (e.g., a system administrator) categorizes and stores the types of associations and their respective values/enumeration with respect to the particular system operation. In an alternative, the association quality values are pre-determined or pre-configured. These values may be obtained from a predetermined or configured data source. More generally, the number of values and their enumeration are determined or otherwise obtained or retrieved in any manner, such as manually (through a user interface), automatically or programmatically (e.g., through a web service), statically (from a database) or dynamically (e.g., through a runtime operation) or some combination thereof.

Figure 5:
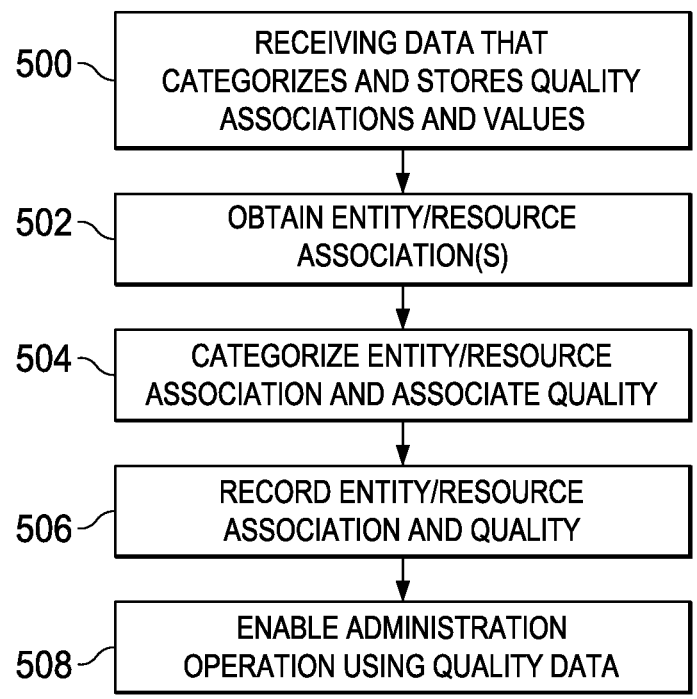
FIG. 5 is a simplified process flow of a method to identify, categorize and record a quality of an entity/resource association according to this disclosure.

FIG. 5 is a process flow that describes the identification, categorization and recording of the quality of entity/resource associations according to this disclosure. The process is initiated at step 500 by receiving data that categorizes and stores the types of associations and their relative values. As noted above, there may be various ways in which this information is obtained. As step 502, an entity/resource association is obtained. This association may be obtained in any manner. For example, the entity/resource association may be observed at the time of the association, or it may be determined subsequent to the activity, or some combination thereof. The techniques for determining the entity/resource association are well-known. At step 504, the entity/resource association is categorized according to the one or more relative quality values. This step may be carried out manually, automatically, programmatically, or otherwise. At step 506, the entity/resource association and its associated quality value is then recorded (e.g., in a log file, in a data store, or the like). Subsequently, an administrative operation retrieves one or more of the data records at step 508 and performs an operation, e.g., to compare data records that include similar entity/resource associations for an entity that has been determined to be a same entity. Based at least on the quality values in the data records, the administration operation 508 may then provide more meaningful or useful outputs as compared to a simple prior art comparison of data records that do not include the quality determinations that are characteristic of the data model herein. As an example, when the administration operation determines that the first and second entity are the same but that there is a difference between a first entity/resource association (obtained from a first system) and a second entity/resource association (obtained from a second system), a quality of the one of the first or second entity/resource associations may then be characterized as unreliable.

The nature of the comparison between or among various entity/resource associations that have been annotated according to the data model herein may be varied. By including the quality annotations, meaningful comparisons are now available to consuming applications and systems.

The term "quality" should be broadly construed to refer to a relative characteristic of the entity/resource association. In this context, other synonyms for the "quality" metric include, without limitation, merit, worth, value, caliber, distinction, rank, grade, class, condition, value, weight and kind.

There are numerous ways in which the data model may be implemented. The data model may be implemented, for example, in a login management system, such as a system that is compliant with RFC 5424 or RFC 3164 (Syslog). Those Internet standards documents define how log data is captured and transmitted as Syslog data. In Syslog, the data structure is a non-structured MSG (message) field. According to this disclosure, the Syslog MSG is annotated (extended) to add a string called "IdentityQuality," which is a string value that contains a quality enumeration as described above in the form of an ordinal list of relative quality. The ordinal list is then mapped to an external dictionary that provides the meaning of the particular ordinal encountered (e.g., 1="LOOSE_IP", 2=AUTH_IP" etc.). Of course, Syslog data records are merely representative. Other type of log formats include, without limitation, IPFIX Flowdata, Apache Common Log Format, and many others. The particular data structure/format in which the entity/resource association is captured is not a limitation of this disclosure.

Figure 6:
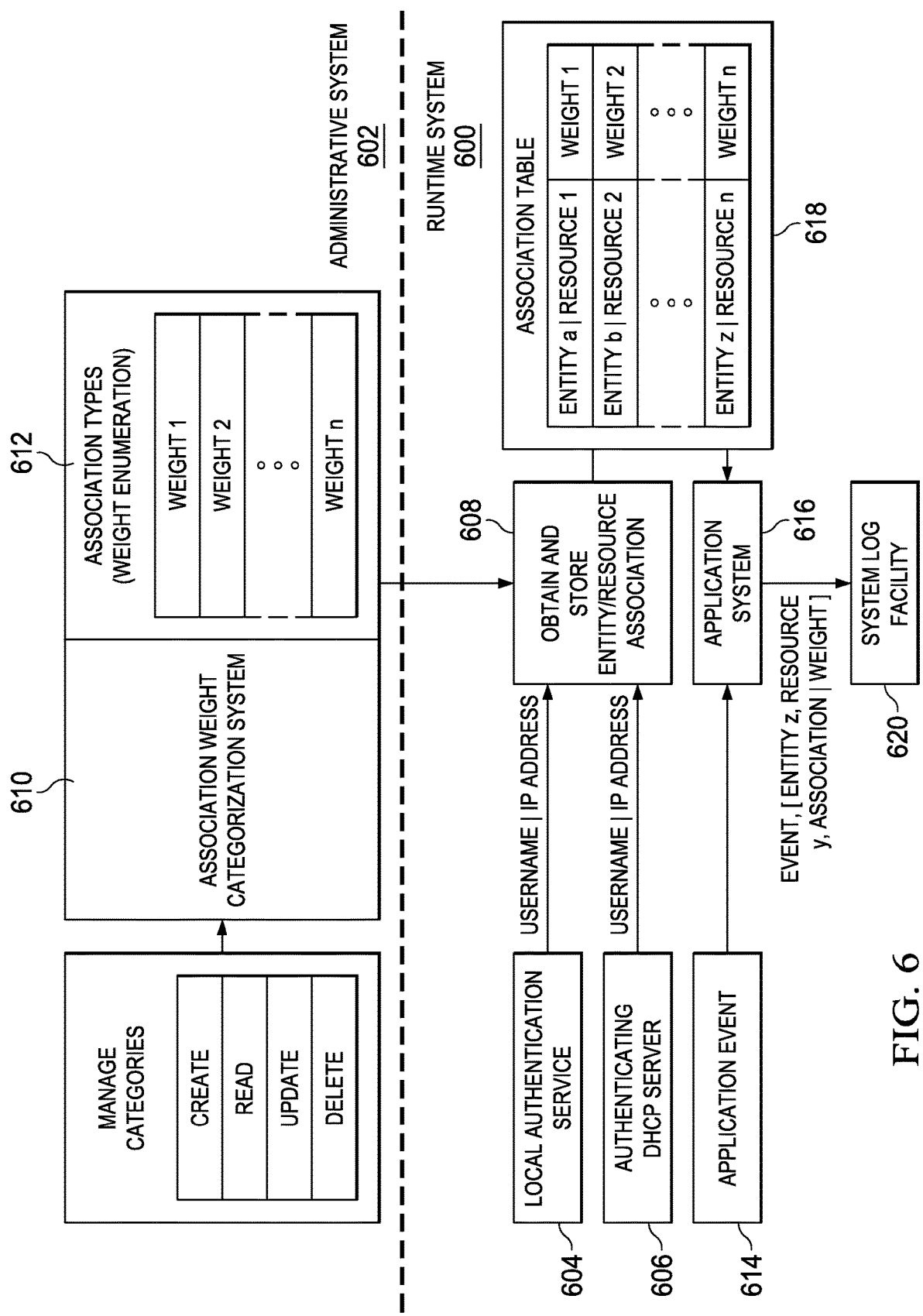
FIG. 6 is an example computing environment in which the entity/resource association quality values are recorded and compared so as to enable meaningful assessments of the data records according to this disclosure.

FIG. 6 illustrates another example scenario that was described above. This scenario involves an enterprise computing environment that includes a runtime system 600, and an administrative system 602. The runtime system 600 has two (2) distinct types of authentication services, namely, a local authentication service 604 that supports enhanced authentication (e.g., SSL-based single sign-on (SSO), federated SSO (F-SSO), and the like), as well as an authenticating DHCP server 606, which hands-out IP addresses for wireless clients or the like. These are merely representative authentication mechanisms. Each of the authentication services 604 and 606 captures an entity/resource association in the form of username|IP address and has the capability of recording (in data object 608) that association using conventional mechanisms. According to this disclosure, the administration system 602 is augmented to support an association weight (quality) categorization system 610. The association weight categorization system 610 typically is implemented in software (as a set of one or more computer programs executed in one or more hardware elements). The system 610 typically provides a configuration tool (e.g. a web-based interface, a command line interface, a programmatic interface, or the like) by which the association types 612 are defined (enumerated). In this example, there are 1-n relative weights that represent the various quality values. In addition, preferably one or more CRUD-based categories (e.g., create, read, update, delete) may be specified to the categorization system. As noted above, the qualities can be pre-configured, pre-determined, determined dynamically, hard-coded, or the like.

In operation, an application event 614 occurs in the relevant application system 616. According to this disclosure, the relevant entity/resource association is then annotated with the appropriate weight value to generate a data record entry (a row of) an association table 618, which is a data structure. In this example scenario, entity "a" is associated with resource "1" at a quality value of "1." A second data record associates entity "b" with resource "2" at a quality value of "2," and so forth. More generally, each application event then may have associated therewith a tuple, namely:

"application event [entity x, resource y, association-|weight]".

The association table 618 is then stored to the system log facility 620. Taking the original example scenario that was described above, it is assumed that the system's administrative operation is comprised of the following definition of association categories (types) and their enumeration: STRONG_AUTHENTICATION (1); LOOSE_AUTHENTICATION (2); and LOOSE_OBSERVATIONAL (3). An example of strong authentication is an entity authenticated to a server over an SSL tunnel using the local authentication service 504, and that SSL tunnel having been associated by authentication to the entity that initiated communication with the server. An example of loose observational might be obtaining login identity and IP address from an Active Directory server that authenticates users to an Active Directory domain and provides the IP address as part of its DHCP service 606. Although not shown, an example of loose authentication might be authentication a user on a system, and then tracking activity by the IP address from which the user authenticated. Of course, these are merely representative scenarios and should not be taken to limit this disclosure.

As noted above, the number and enumeration of the quality types (however specified) is not limited, provided some degree of relative values are provided.

While the data model and associated techniques described are quite useful to capture the quality of authentication in log records, this is not a limitation. The techniques herein may be used to record the quality of any type of application event. The techniques may be implemented, for example, in an identity-aware intrusion prevention system (IPS), in a Web Access Gateway (WAG), or in many other types of computing systems including, without limitation, policy management systems, incident management systems, data loss prevention systems, identity provisioning systems, access control systems, compliance systems, logging systems, auditing systems, and many others.

The techniques herein provide significant advantages. When entity/resource associations are annotated to include relative quality values in this manner, much more useful comparisons of apparently similar entity/resource associations may be carried out as compared to the prior art. The resulting analytics are much more valuable and provide high quality reliable information for data management systems.

The association quality categorization functionality described above (including the configuration tool and the runtime functions) may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various client-side or server-side architectures including simple n-tier architectures, web portals, federated systems, and the like. The techniques herein may be practiced in a loosely-coupled Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the entity/resource association quality functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the association quality categorization system or one or more of its component sub-systems are implemented a special purpose computer, preferably in software executed by one or more processors. The software is maintained in one or more data stores or memories associated with the one or more processors, and the software may be implemented as one or more computer programs. Collectively, this special-purpose hardware and software comprises or supplements an existing auditing or compliance management solution, as has been described. The association types, as well as the association table, are data structures that may be stored in data stores, databases, or the like.

In a representative embodiment, an auditing or log facility management central management console exposes one or more web-based interfaces that may be used to create and/or modify the association types and values in the manner described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Any application or functionality described herein may be implemented as native code, by providing hooks into another application, by facilitating use of the mechanism as a plug-in, by linking to the mechanism, and the like.

As noted, the above-described functions may be used in any system, device, portal, site, or the like wherein it is desired to analyze data for managing reporting, compliance or other security policies.

Having described my invention, what I now claim is as follows:

1. A method of categorizing activity in a computing system having a database, comprising:
configuring the database according to an entity/resource data model that is extended to include a quality enumerator;
monitoring an interaction between an entity and a resource to define an entity/resource association;
at capture of the interaction, annotating the entity/resource association according to an enumerated set of relative quality values by associating, as the quality enumerator, a quality to the entity/resource association, the quality being one of a set of relative qualities as defined in the enumerated set of relative quality values, and wherein the quality associated is dependent on a characteristic of the interaction; and
recording in the database the entity/resource association together with the quality that has been annotated to provide improved information storage and retrieval in the computing system;
wherein at least one of the monitoring, associating and recording steps is carried out in software executing in a hardware element.

2. The method as described in claim 1 further including defining or obtaining the set of relative qualities prior to the monitoring.

3. The method as described in claim 1 further including:
comparing qualities associated with first and second entity/resource associations; and
making a determination regarding the first and second entity/resource associations based on the qualities.

4. The method as described in claim 3 wherein the determination is that one of the respective first and second entity/resource associations is not reliable.

5. The method as described in claim 1 wherein the activity is an authentication activity and the set of relative qualities are one of: a strong authentication, a loose binding, and a loose association.

6. The method as described in claim 1 wherein the quality is designated as one of: an enumerated value, and a numerical value.

7. The method as described in claim 1 wherein the entity/resource association is recorded together with the quality in a log file.

8. Apparatus, comprising:
a processor;

computer memory holding computer program instructions that when executed by the processor categorize activity in a computing system having a database configured according to an entity/resource data model that has been extended to include a quality enumerator, the computer program instructions comprising:
- program code to monitor an interaction between an entity and a resource to define an entity/resource association;
- program code operative at capture of the interaction to annotate the entity/resource association according to an enumerated set of relative quality values by associating, as the quality enumerator, a quality to the entity/resource association, the quality being one of a set of relative qualities as defined in the enumerated set of relative quality values, and wherein the quality associated is dependent on a characteristic of the interaction; and
- program code to record in the database the entity/resource association together with the quality that has been annotated to provide improved information storage and retrieval in the computing system.

9. The apparatus as described in claim 8 wherein the computer program instructions further include program code to define or obtain the set of relative qualities prior to monitoring the interaction.

10. The apparatus as described in claim 8 wherein the computer program instructions further include:
- program code to compare qualities associated with first and second entity/resource associations; and
- program code to make a determination regarding the first and second entity/resource associations based on the qualities.

11. The apparatus as described in claim 10 wherein the determination is that one of the respective first and second entity/resource associations is not reliable.

12. The apparatus as described in claim 8 wherein the activity is an authentication activity and the set of relative qualities are one of: a strong authentication, a loose binding, and a loose association.

13. The apparatus as described in claim 8 wherein the quality is designated as one of: an enumerated value, and a numerical value.

14. The apparatus as described in claim 8 wherein the entity/resource association is recorded together with the quality in a log file.

15. A computer program product in a non-transitory computer readable medium, the computer program product holding computer program instructions executed by a data processing system to categorize activity associated with the data processing system, the data processing system having a database configured using an entity/resource data model that has been extended to include a quality enumerator, comprising:
- program code to monitor an interaction between an entity and a resource to define an entity/resource association;
- program code operative at capture of the interaction to annotate the entity/resource association according to an enumerated set of relative quality values by associating, as the quality enumerator, a quality to the entity/resource association, the quality being one of a set of relative qualities as defined in the enumerated set of relative quality values, and wherein the quality associated is dependent on a characteristic of the interaction; and
- program code to record in the database the entity/resource association together with the quality that has been annotated to provide improved information storage and retrieval in the data processing system.

16. The computer program product as described in claim 15 wherein the computer program instructions further include program code to define or obtain the set of relative qualities prior to monitoring the interaction.

17. The computer program product as described in claim 15 wherein the computer program instructions further include:
- program code to compare qualities associated with first and second entity/resource associations; and
- program code to make a determination regarding the first and second entity/resource associations based on the qualities.

18. The computer program product as described in claim 17 wherein the determination is that one of the respective first and second entity/resource associations is not reliable.

19. The computer program product as described in claim 15 wherein the activity is an authentication activity and the set of relative qualities are one of: a strong authentication, a loose binding, and a loose association.

20. The computer program product as described in claim 15 wherein the quality is designated as one of: an enumerated value, and a numerical value.

* * * * *